July 21, 1936. F. G. THWAITS Re. 20,038

DROP FRAME TANK TRAILER

Original Filed Feb. 12, 1930 2 Sheets-Sheet 1

INVENTOR.
Frederick G. Thwaite
BY
Morsell, Kenny & Morsell
ATTORNEYS.

July 21, 1936. F. G. THWAITS Re. 20,038

DROP FRAME TANK TRAILER

Original Filed Feb. 12, 1930 2 Sheets-Sheet 2

INVENTOR.
Frederick G. Thwaits
BY
Morsell, Keeney & Morsell
ATTORNEYS.

Reissued July 21, 1936

Re. 20,038

UNITED STATES PATENT OFFICE 20,038

DROP FRAME TANK TRAILER

Frederick G. Thwaits, Wauwatosa, Wis., assignor to The Heil Co., Milwaukee, Wis., a corporation of Wisconsin Original No. 1,814,098, dated July 14, 1931, Serial No. 427,804, February 12, 1930. Application for reissue June 26, 1933, Serial No. 677,718

8 Claims. (Cl. 280—5)

This invention relates to improvements in drop frame tank trailers.

Tank trailers are adapted to be pivotally secured at their front end portions to a truck or tractor which furnishes the motive power for the tank trailer. It is desirable to have the forward end portion of the trailer extend as far as possible over the tractor chassis and as close as is practical to the rear of the tractor cab. However, due regard must be had for the fact that the tractor and trailer must turn with respect to each other and in the proximity of the front of the tank trailer to the tractor cab allowance must be made for said turning movements.

With the above in mind, it is one of the objects of the present invention to provide a drop frame tank trailer having a continuous rounded front head and a rounded front can rack portion whereby the front end portion of the tank trailer can be secured to the tractor in close proximity to the cab, minimizing in the loss of space between the two, yet allowing free turning movements between the tractor and tank trailer.

A further object of the invention is to provide a tank trailer having a rounded front end portion so formed that the joints between ends of the rounded front portion of the can rack and the sides of the can rack are very strong and are not noticeable, and said arrangement having the further advantage of adding materially to the attractiveness and distinctiveness of the appearance of the front end portion of said tank trailer.

The ordinary tank trailer is so constructed that the entire structure must be built up at the factory, including the mounting of the can racks and tanks on the trailer. This necessarily makes the shipping of the trailers from the factory to remote distances quite expensive. A material advantage lies in the construction of the present tank trailer in the arrangement of the under-structure whereby tanks may be assembled completely on the under-structure and then at the destination the tanks and under-structure may be mounted on the trailer.

A further object of the invention is to provide a drop frame tank trailer arranged to very conveniently hold receptacles and other devices incident to tank trailers, and having door arrangements to permit ready access to the hose tubes.

A further object of the invention is to provide a drop frame tank trailer which is of very simple construction, is strong and durable, is easily assembled, and is well adapted for the purposes described.

With the above and other objects in view, the invention consists of the improved drop frame tank trailer and its parts and combinations as set forth in the claims, and all equivalents thereof.

In the accompanying drawings in which the same reference characters indicate the same parts in all of the views.

Figure 1:
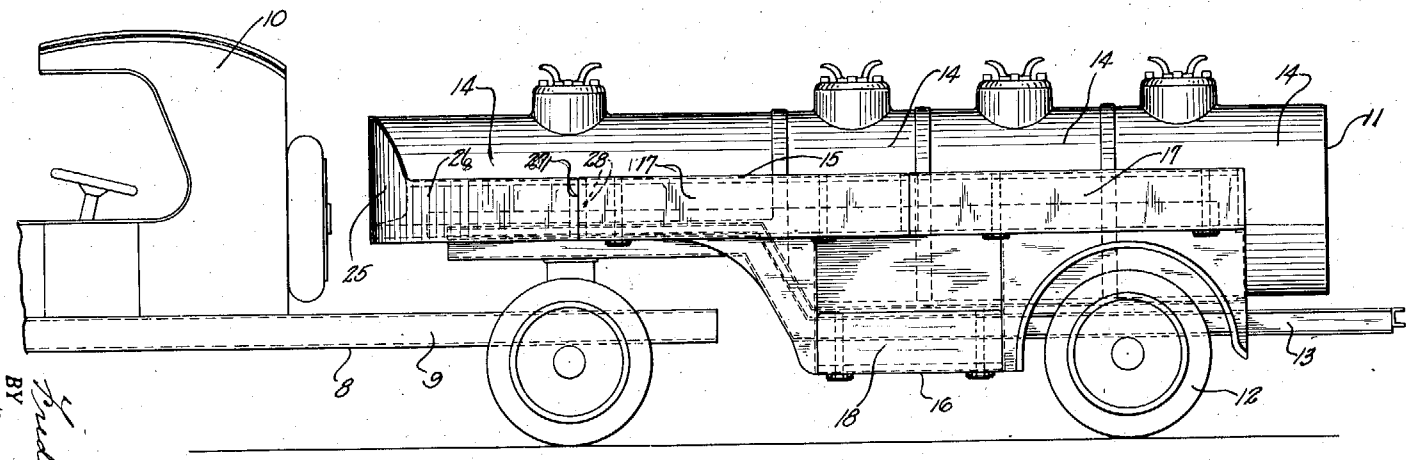
Fig. 1 is a side view of the improved drop frame tank trailer connected to a tractor.

Referring now more particularly to the drawings it will appear that the numeral 8 indicates a truck or tractor of the type employed for pulling or furnishing the motive power for trailers. Said truck includes a wheeled chassis 9 and a front operator's cab 10.

The invention resides particularly in the construction of the drop frame tank trailer which is designated generally in the drawings by the numeral 11, and its relation and disposition with respect to the tractor 8. The trailer is portably mounted on rearwardly disposed wheels 12 and in normal use the front end portion of the trailer is adapted to be engaged with the rear portion of the tractor by any common fifth-wheel construction which will permit turning movements between the tractor and trailer.

It is desirable to have the front end portion of the trailer extend as far as possible forwardly over the tractor chassis so that the tractor will bear a good proportion of the weight of the trailer, and also to conserve in the overall length of the combined tractor and trailer.

The chassis or frame of the trailer includes spaced apart longitudinally extending channel iron members 13 which are forwardly upwardly stepped or of angular shape so as to extend in proper relation over the chassis of the tractor.

Figure 4:
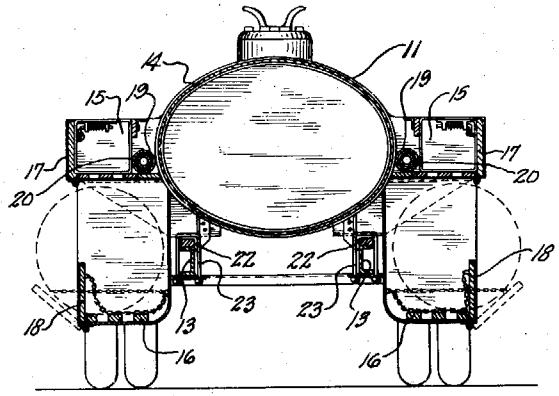
Fig. 4 is a cross-sectional view taken on line 4—4 of Fig. 2.
Figure 3:
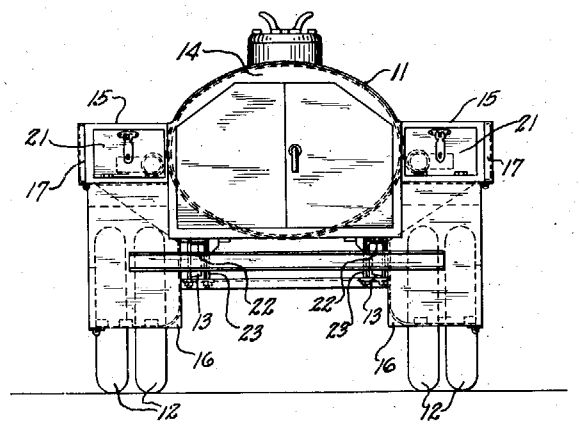
Fig. 3 is a rear end view thereof.

The tank trailer also includes an under-structure, which under-structure carries in proper relationship a suitable number of joined and longitudinally alined tanks 14, longitudinally extending running boards or can racks 15 on opposite sides thereof, and barrel racks 16 below portions of the can racks. The sides 17 of the can racks are hingedly mounted so that they may be dropped or opened to afford ready access to the can racks, while hinged sides 18 are also provided for the barrel racks for access thereto or to enlarge the capacity thereof, as shown in dotted lines in Fig. 4. Extending longitudinally along the outer sides of the tanks 14 between the same and the can racks are hose tubes 19 adapted to contain therein suitable hoses 20. The rear portions of the can racks are closed by hinged doors 21 which, when opened, will permit ready access to the hose tubes 19 for the insertion or removal of the hoses 20 therefrom.

In the assembly of the drop frame tank trailer the portions above mentioned are secured together, and underlying the joined tanks and rack portions are a pair of spaced apart understructure members 22. Said under-structure members are shaped and stepped to correspond with the stepped arrangement of the frame members 13 of the trailer and when it is desired to mount the assembled tanks and racks on the trailer chassis, the assembled tanks and racks are under-structure are mounted with respect to the trailer chassis members 13 so that the under-structure members 22 rest on the upper surfaces of the members 13, in the manner shown in Fig. 1. Then it is merely necessary to secure the members 22 and 13 together by means of spaced apart U-bolts 23. The forwardmost tank 14 is provided with a front head which is rounded or curved on a radius, as indicated at 24 in Fig. 2. Secured against the outer surface of said rounded front head is a can rack front end portion 25 which is bent or curved to conform with the curvature of the front head and said member 25 is formed with side wing portions 26 of a reduced height to correspond with the height of the sides 17 of the can racks. Said wing portions 26 of the can rack front portion are relatively elongated and are rearwardly curved on the same radius as the curvature of the intermediate portion of the member 25 and the front head of the forwardmost tank. The result is that the outer ends of the wing portions 26 may be brought into juncture with the forward ends of the adjacent can rack sides 17 and will meet the same in vertical lines in the vertical planes of the sides 17. At the lines of juncture of the ends of the wings 26 with the forward ends of the can rack sides 17, indicated by the numerals 27, inner brackets or braces 28 are provided, carried by the can racks, and the outer ends of the members 26 are welded to the outer faces of the braces 28.

Figure 2:
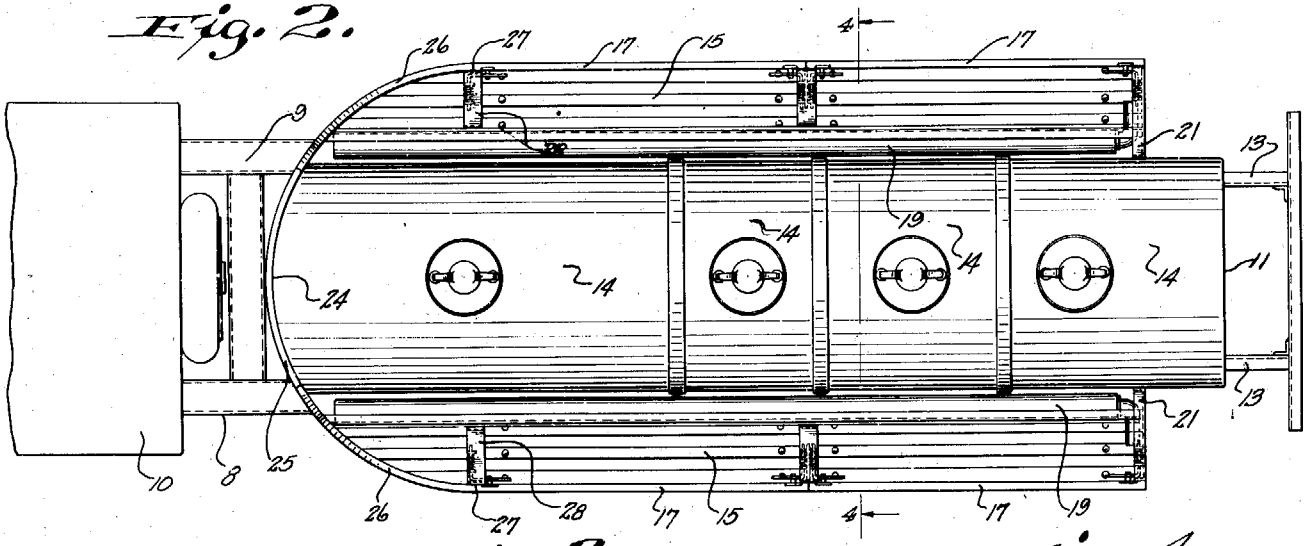
Fig. 2 is a plan view thereof.

By special reference to Figs. 1 and 2 it will be observed that, because of the curvature of the front head of the forwardmost tank 14 and the corresponding curvature of the front can rack member 25, and the extension wings 26 and their juncture with the members 17, the front end portion of the tank trailer may be disposed very close to the cab 10 of the tractor and the curvature of the said front portions will permit and accommodate turning movements of the tractor and trailer with respect to each other. The side walls or members 17 coacting with the wings 26 of the front portion 25, obviously provide a neat appearing upright band or skirting having its forward end portion rounded to correspond with the front curvature 24 of the main tank, and the top of this skirting has a substantially straight top edge extending throughout the length of the tank body. This skirting also extends downwardly between the pulling vehicle and the trailer wheels and has a curved cut out portion in the bottom edge thereof adjacent to the pulling vehicle wheels at the forward end of the skirting, as clearly shown in Fig. 1. Also the arrangement is attractive in appearance and forms a very strong construction.

From the foregoing description it will be seen that the improved drop frame tank trailer is of simple and novel construction and is well adapted for the purposes set forth.

What is claimed as the invention is:

1. In a tank trailer structure, the combination of supporting beams, a tank mounted thereon, the front end portion of the tank being curved in a horizontal plane on an axis toward the rear of the tank, a rack extending along each side of the tank, said rack being provided with outer sides, and a plate covering the front of the tank and curved concentrically with said front and having outwardly, rearwardly extending wings of a reduced height secured at their end portions in juxtaposition to the front ends of the rack sides and merging into the plane of said sides.

2. In a tank trailer structure, the combination of forwardly, upwardly stepped supporting beams, a tank mounted thereon, the front end portion of the tank being curved in a horizontal plane on an axis toward the rear of the tank, a rack extending along each side of the tank, said racks being formed with outer sides terminating short of the front end of the tank, compartments formed on opposite sides of the tank between the lower portions of the supporting beams and the racks, and a plate covering the front of the tank and curved concentrically with said front and having rearwardly extending wings of a reduced height secured at their end portions in juxtaposition to the front ends of the rack sides, merging into the plane of said sides, and forming forward continuations of the same.

3. In a tank trailer structure, the combination of a wheeled chassis, an under-structure corresponding in shape to the shape of the chassis and overlying the same, means detachably connecting the under-structure to the chassis, a tank carried by the under-structure, racks extending along opposite sides of the tank, said racks having outer side portions, the front of the tank being curved, and a plate secured to the front of the tank and correspondingly curved and having outwardly, rearwardly extending wings meeting said rack sides in the planes of the same.

4. The combination with a pulling vehicle, of a semi-trailer tank vehicle comprising a tank body having an offset therein providing a reduced end portion on said tank body, a fifth wheel structure on said pulling vehicle supporting the reduced end portion of said tank body, and a skirting on said semi-trailer vehicle depending below the bottom of said reduced end portion on both sides of said tank body at said fifth wheel structure, said skirting having a portion depending below the bottom of said tank body at said offset.

5. The combination with a pulling vehicle, of a semi-trailer tank vehicle comprising a tank body having an offset therein providing a reduced end portion on said tank body, a fifth wheel structure on said pulling vehicle supporting the reduced end portion of said tank body, and a skirting on said semi-trailer vehicle depending below the bottom of said reduced end portion on both sides of said tank body at said fifth wheel structure, said skirting having a portion depending below the bottom of said tank body at said offset, to hide said offset and extending rearwardly from said offset a substantial distance.

6. The combination with a pulling vehicle having fifth wheel structure mounted thereon, of a semi-trailer tank vehicle comprising a tank having a vertically reduced end portion provided with a laterally curved end wall and coacting with said fifth wheel structure rearwardly of said wall, and a continuous skirting on said semi-trailer vehicle depending below the bottom of said reduced end portion on both sides of said tank at said fifth wheel structure and at said wall.

7. The combination with a pulling vehicle having fifth wheel structure mounted on the rear thereof, of a semi-trailer tank vehicle comprising a tank having a vertically reduced front end portion provided with a laterally curved front wall and coacting with said fifth wheel structure rearwardly of said wall, and a continuous skirting on said semi-trailer vehicle depending below the bottom of said reduced end portion and extending on both sides of and in front of said fifth wheel structure.

8. The combination with a draft vehicle having fifth wheel structure mounted thereon, of a semi-trailer tank vehicle comprising a tank having a reduced front end portion connected with the rear of the tank by an offset and resting upon said fifth wheel structure, and a continuous skirting on said semi-trailer vehicle extending around the front of said reduced tank portion and along the opposite sides thereof and depending below said tank portion at said fifth wheel structure, said skirting also having rear portions depending below the bottom of said tank at said offset.

FREDERICK G. THWAITS.